United States Patent [19]
Bush et al.

[11] 4,157,459
[45] Jun. 5, 1979

[54] ELECTRONIC AUDIO SIGNALLING DEVICE FOR TELEPHONES

[75] Inventors: Terry D. Bush; D. Joseph Denen, both of Columbus, Ohio

[73] Assignee: Floyd Bell Associates Inc., Columbus, Ohio

[21] Appl. No.: 843,456

[22] Filed: Oct. 19, 1977

[51] Int. Cl.² .......................................... H04M 1/00
[52] U.S. Cl. .................................................. 179/84 T
[58] Field of Search ............... 179/84 R, 84 T, 81 R, 179/110 A; 181/148, 153, 156, 185; 340/384 E

[56] References Cited

U.S. PATENT DOCUMENTS

| | | | |
|---|---|---|---|
| 1,884,724 | 10/1932 | Keller | 181/148 |
| 2,808,463 | 10/1957 | Jenkins | 179/84 T |
| 3,826,333 | 7/1974 | Buckwalter | 181/156 |
| 3,860,838 | 1/1975 | Kumon | 179/110 A |

FOREIGN PATENT DOCUMENTS 2203857  1/1972  Fed. Rep. of Germany ......... 179/84 T Primary Examiner—Kathleen H. Claffy
Assistant Examiner—Joseph A. Popek
Attorney, Agent, or Firm—William V. Miller

[57] ABSTRACT

A signalling device to be substituted for the usual electromechanical ringer of a telephone, either as a replacement for that ringer in existing telephone instruments or as a part of the original manufactured instrument. It includes solid-state circuitry for eliminating noise pulses and an electronic oscillator circuit which will operate effectively on a minimum current supply along with a mechanical arrangement of components to obtain a compact unit with a folded horn type acoustical loading system and adjustable volume control.

7 Claims, 8 Drawing Figures

4,157,459

ELECTRONIC AUDIO SIGNALLING DEVICE FOR TELEPHONES

BACKGROUND OF THE INVENTION

At the present time, the tendency in telephone installations is to have many extensions on the same line. The electromechanical ringers or bells now commonly on telephone instruments consume relatively large amounts of power so that three or four instruments at the most can be connected to a standard telephone line and still have the ringers function. Even if greater amounts of power could be supplied for actuating the ringers, the standard telephone lines are not adequate to carry that power.

Present ringers or bells are also limited by their construction and principle of operation. As the ringer is electromechanical, a coil of wire is employed and for compatibility with the ringer signal, this coil is composed of many turns of fine wire. The coil, in turn, is mounted within a magnetic circuit comprised of several different magnetic or permeable elements. Moreover, it must be tuned to a particular ringing frequency by careful selection of the vibrating masses and spring forces. Thus, it must be a precision-manufactured instrument of subtle complexity and considerable expense. These principles of design and operation preclude the possibility of miniturization. Thus, a ringer of this size and expense has had a definite influence of the physical design of more streamlined and compact or more stylish telephones in the future as well as add to the retail price of such telephones. Also, to some people the usual bell has a harsh and irritating sound.

Others have developed or attempted to develop electronic ringer substitutes. The resulting hardware has had limited application in office phones and PBX systems. Low volume outputs, lack of volume control, size reliability and noise pick-up were all limiting factors. An overriding problem in the design of circuit to replace a telephone ringer is that a simple electronic tone emitter is undesirable due to spurious sound being generated when any electrical noise, i.e., voltage pulses other than ringing voltage, is present on the line to the ringer. These noise pulses can be generated from dialing, picking up the receiver, etc.

SUMMARY OF THE INVENTION

The present invention provides for a telephone signalling device which is much more compact and smaller, lighter, simpler, and more efficient than the electromechanical bell now commonly in use. Furthermore, it will have a penetrating, insistent but not unpleasant tonal quality. Although the device of this invention is especially useful as a replacement for the usual bell of a telephone, and will be described mainly as such herein, it is to be understood that it can be incorporated in a telephone as originally manufactured with resultant reduction in size, etc.

The device of this invention includes a solid state electronic square wave oscillator circuit which includes a piezoelectric disc which is actuated by the usual telephone current supply to provide the audio signal. It is mounted on a diaphragm within a tubular housing in cooperation with an acoustical baffle in such a manner as to provide a folded horn acoustical loading system. It is important that the oscillator circuit be normally disabled and only allowed to operate during the time when proper signalling voltage is supplied. Thus the circuit includes elements solely for eliminating certain voltage pulses, other than ringing or signalling voltage, resulting from normal usage of the telephone such as dialing, picking up the receiver, etc. The circuit also includes additional independent elements to serve as a voltage-limiting network, elements to insure low power consumption, elements for frequency tuning and modulation and a downstream buffer driving state in the form of a bridge amplifier. Beyond or outwardly of the acoustical baffle, the tubular housing is provided with a volume control in the form of a sound-dampening unit consisting of relatively rotatable damper members which provide a convenient mechanical sound-level control.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
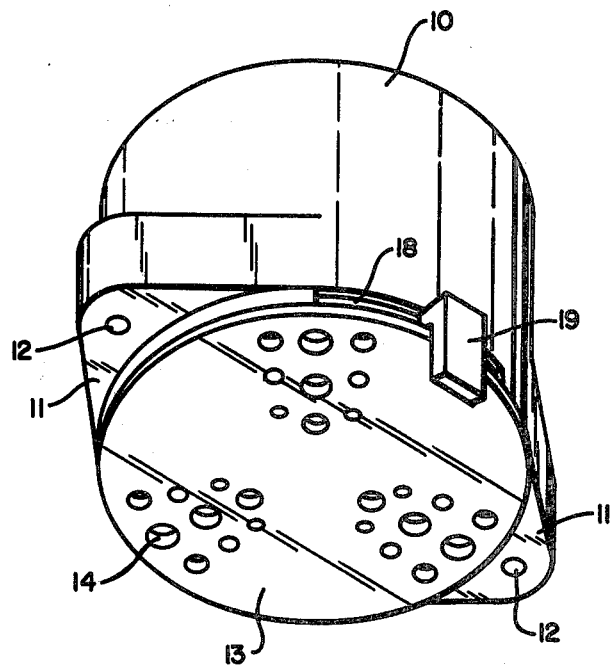
FIG. 1 is a perspective view of the device.
Figure 2:
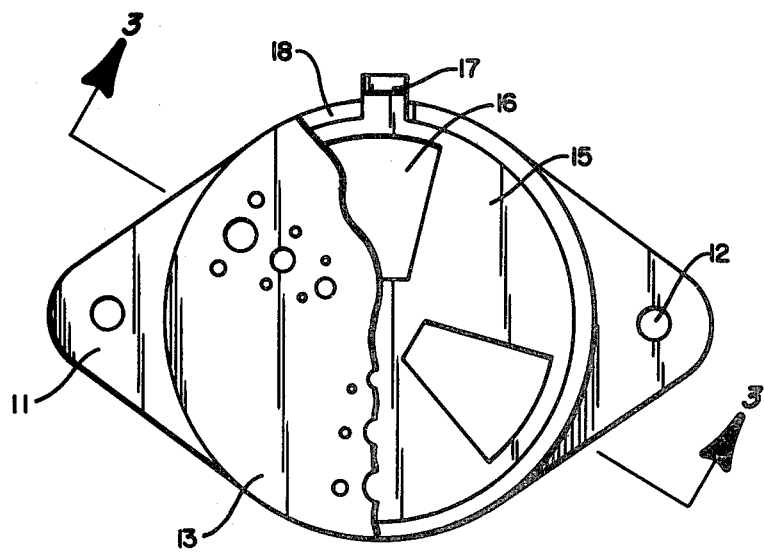
FIG. 2 is a view of the bottom end of the device illustrated in FIG. 1, partly cut away.
Figure 3:
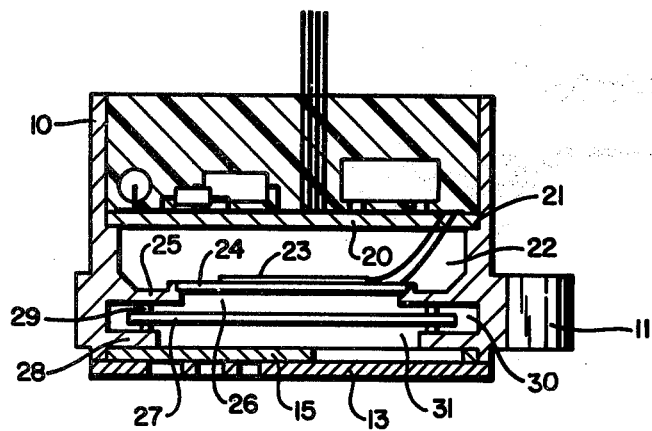
FIG. 3 is an axial sectional view taken along line 3—3 of FIG. 2.

The physical structure of the device is shown in FIGS. 1 to 4, inclusive, and it includes a tubular housing 10, which is preferably of a suitable rigid plastic. This tubular housing has opposite diametrically-projecting mounted ears 11, with screw-passing openings 12, at its one end which is the lower or bottom end with the housing in the position indicated in FIG. 1. The lower end carries a fixed foraminous or perforated disc 13 which is adhered to the lower extremity of the tubular housing. The perforations 14 thereof are shown arranged in three angularly-spaced groups but other arrangements may be used. Within the end of the tubular housing 10 and resting on the fixed disc 13, is a relatively rotatable disc 15 which is provided with three large segmental openings 16 that may be brought into substantial coincidence with the respective sets of perforations 14, in the disc 13, or to expose or cover any selected area thereof with its intervening imperforate areas. Thus, a mechanical volume control is provided in the form of a sound dampener which consists of superimposed perforated baffles relatively rotatable to completely close the sound passages provided thereby or to select the area of the passages to be opened. To rotate the disc 15, it is provided with a radially-extending lug 17 on its periphery, which extends through a segmental slot 18 in the edge of the housing 10, and which has a right-angle bend 19 that can be readily engaged by the fingers exteriorly of the housing.

The elements of the circuit of the device are disposed within the housing 10 and consist of a printed circuit board assembly 20 (FIG. 3) which carries most of the electrical components, the board being of disc-shape and resting on a circular shoulder 21 intermediate the height of the tubular housing. Above, the assembly 20, the housing 10 is filled with suitable plastic potting material to hold the assembly in place and protect the elements thereof with a water tight seal.

Below the assembly 20, in the housing 10, is formed the chamber 22 and within this chamber is mounted the signalling device of the circuit which consists of a disc-like amorphous piezoelectric ceramic element 23 permanently bonded to one side, the upper side in this example, of a thin flexible circular diaphragm 24, preferably of brass, which rests on and is centered on an annular flange or ledge 25 (FIGS. 3 and 4) within the housing. Beyond or below the diaphragm 24 is mounted, in a fixed axial position, a relatively thick metal disc 27, preferably of aluminum, to serve as an acoustical baffle. Cavity 26 is between discs 24 and 27. This rigid disc 27 is supported by an inwardly projecting double flange arrangement, including flange 25, from the side of the housing. The flanges 25 and 28 thereof carry angularly spaced pairs of opposed pins 29, between which the disc 27 is held, and which permit passage radially of sound waves into and out of a surrounding annular chamber 30. This provides a folded horn arrangement which is discussed in the copending application of Harrington Ser. No. 788,693, filed, Apr. 18, 1977.

In operation, the piezoelectric element 23 will be energized by the telephone current and will drive the flexible diaphragm 24 to produce acoustical current or pressure waves which travel through the horn cavity 26 into contact with the baffle 27 which will deflect them radially outwardly through the horn cavity 26 into the annular space 30, downwardly and then radially inwardly to concentrate them in the outermost chamber 31 between the baffle 27 and disc 15. The volume of the sound emitted from the chamber 31 can be controlled by the setting of the disc 15.

Thus, in this device there will be provided a folded horn type acoustical loading system, due to the fact that the sound waves are caused to travel a curvaceous path around the edge of the baffle 27 before they enter the chamber 31, and then leave the chamber 31 of the housing through the volume control damper including the rotatable disc 15. This acoustical loading system will result in higher efficiency that reflects the achievement of substantially higher sound outputs from the piezoelectric element of the device with substantially lower operating currents.

Figure 5:
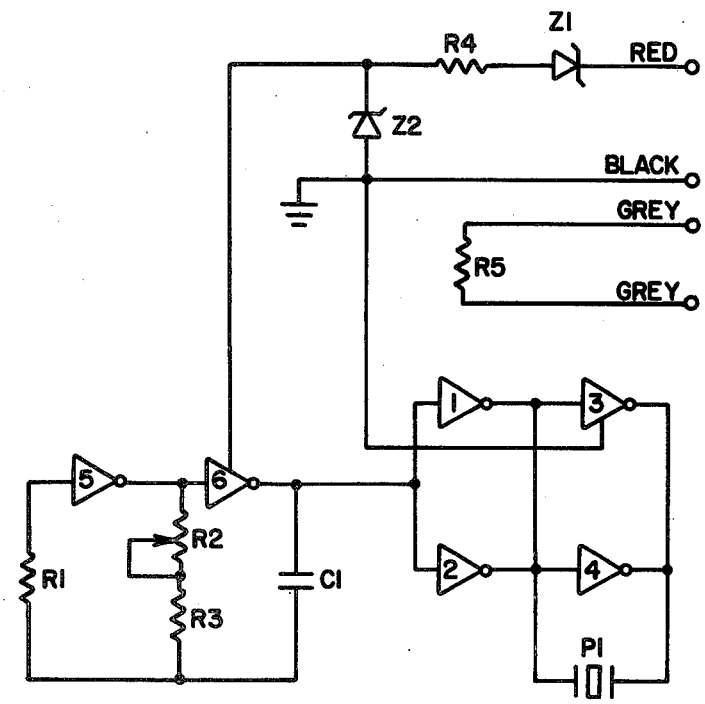
FIG. 5 is a schematic illustration of the circuit of the device.
Figure 4:
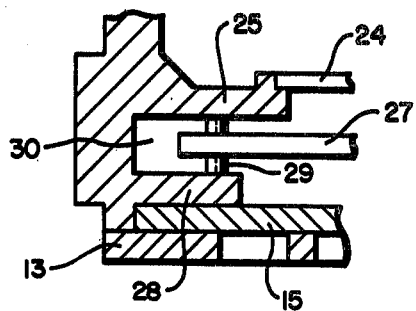
FIG. 4 is an enlarged axial sectional view of the lower end of the device.

The circuit of this unit or device is illustrated schematically in FIG. 5 and is shown as including four leads. The four leads are identified in the schematic with the color designations red, black, grey, and grey. These four leads are provided to facilitate connecting the device to the usual telephone circuit.

The grey leads may be internally shorted by a jumper connection (not shown) or, as a manufacturing option, may attach to a resistor R5 of a value characteristic to a particular ringer of the telephone which is to be replaced. The grey/grey leads are a convenience feature which eliminates the need of a separate and external resistor or jumper when this device is substituted for the standard electromechanical bell which requires all four connections. The red and black leads are the active terminals through which the signal current is applied to the circuit of this device. Functionally, within the telephone, they are similar and may be reversely-connected. The red/black color scheme is retained only as telephone conventional practice which allows direct, color-coded replacement connection.

Signal-attenuating means is provided for disabling the circuit normally and allowing it to operate only when proper signalling voltage is supplied to the telephone. Thus the red lead of the circuit is shown connected to a voltage-clamping element Z1, which may be a 60 volt 1W zener diode to eliminate voltage pulses of 60 volts or less. Its sole purpose is to suppress dial and other voltage pulses and prevent the signalling device or unit from producing a spurious signal by voltage pulses, other than the signalling voltage, resulting from noises caused by dialing or other normal operation of the telephone. During dialing, the normal 45 volt DC power to the telephone is shorted to ground by switches in the dial mechanism by the usual telephone. This gives rise to a low frequency AC signal of 45 volts peak-to-peak amplitude. Since the zener diode Z1 will not allow the passage of current for signals of less than 60 volts amplitude, such spurious signals are not passed on and will have no effect on the audio-signalling part of this circuit.

Resistance R4, which may be a 15K, ¼W resistor, is connected in series with a voltage-clamping element in the form of zener diode Z1 and along with Z2, which may be a 62V, 1W, zener diode, compose a voltage-limiting network which allows no more than 15 volts to be applied in the integrated circuit in the forward or operating direction and no more than about 0.7 volts to the applied in the reverse direction. As peak-to-peak AC potentials of 300 volts are expected to be common in telephones, this network is important. Elements R4 and Z2 also afford good protection against lightening-induced transients which may briefly reach 1000 volts of either polarity at the device terminals. Equipment in standard use on telephone lines is rated to hold such transients to less than half that valve. Zener diode Z2 is connected to the red lead beyond R4 and is also connected to the black lead which is grounded at G. This voltage-limiting network effects shunt rectification and effectively protects the audio-signalling part of the circuit from transient voltages.

The red and black leads are also connected to the main active part of the circuit, as indicated, which is complementary metal oxide semiconductor (CMOS) hex inverter integrated circuit chosen for its square wave production economy, low power consumption, and ease of circuit application. This integrated circuit includes six inverters which are numbered 1 to 6. Two of the six inverters (5 and 6) are configured as a square wave driving oscillator with components consisting of resistance R1, R2 and R3 and condenser C1. The condenser may be 0.001F, 100 V MYLAR type, and the resistance 2.2 MEG. OHM, ¼ Watt; 50 K OHM, TRIM-POT and 100 K OHM, ¼ Watt, respectively. Element R2 is a potentiometer which affords some frequency tuning range for matching the circuit to the desired acoustic performance.

The remaining four gates or inverters 1, 2, 3 and 4 form a buffer driving stage and are configured as a bridge amplifier which has the important beneficial property of applying twice the power supply voltage as a peak-to-peak drive to the ceramic piezoelectric crystal, P1. In the case of the previously noted 15 volt power supply, the peak-to-peak drive to the crystal, P1, would be 30 volts, a considerable improvement. The sound output of the crystal increases roughly as the square of the voltage applied to it, and hence is about four times greater as a result of the bridge amplifier. Crystal P1 is preferably a lead zirconate-titanate wafer bonded to the metal disc 24. This circuit is of extreme simplicity with resulting economy and yet is very effective for its intended purpose. It will be apparent that frequency control of the oscillator circuit by R2 is independent of disabling circuit diode Z1.

Figure 6:
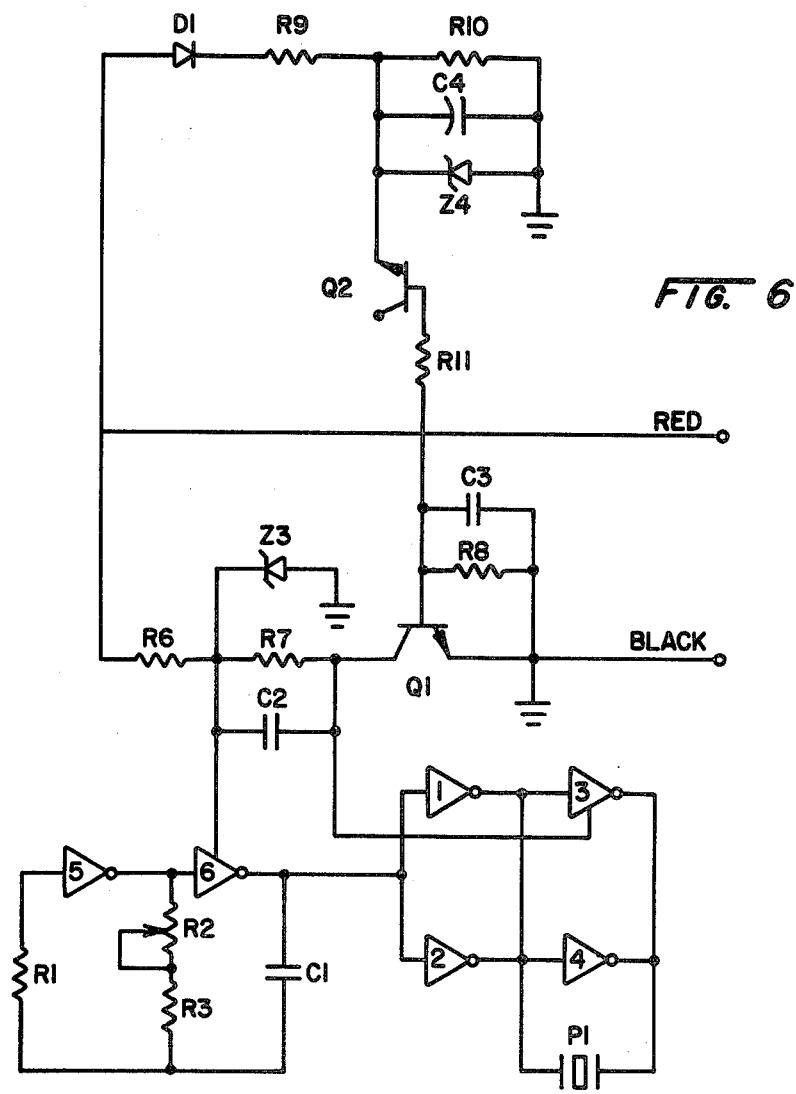
FIG. 6 is a schematic illustration of a modified circuit.

In FIG. 6, there is illustrated a different circuit for a signalling device embodying this invention. This circuit also includes the square wave oscillator audio-signalling circuit portion and an even more effective circuit portion for normally disabling the square wave oscillator portion until proper signalling voltage is supplied thereto by the telephone. This will prevent spurious sound being generated when any electrical noise, i.e., voltage pulses other than proper signalling voltage, is present on the line to the oscillator circuit.

In the circuit example of FIG. 6, the oscillator portion of the circuit is exactly the same as before including the six inverters 1-6, the crystal P1, the square wave condenser C1, and the resistences R1, R2 and R3 all connected in the circuit the same as before.

The transistor Q1 may be of the Darlington NPN type and completes the oscillator circuit path to ground. Normally this transistor is not conducting, thus disabling the oscillator circuit.

The resistor R6, which may be a 33K resistor, and a voltage-clamping element in the form of zener diode Z3, which may be a 15 Volt 1W zener diode, provide shunt rectification for a 15 volt supply to the oscillator circuit portion any time sufficient signalling voltage is supplied to the telephone. The resistor R7, which may be a 10K resistor, and capacitor C2, which may be a 0.047 microfarad capacitor, in parallel with the oscillator provide additional suppression of noise should the transistor Q1 allow some leakage of current during high voltage noise impulses. The resistance R8, which may be a 1M resistor, prevents any collector base leakage from turning on the transistor Q1. The capacitor C3, which is like C2, prevents the transistor from turning on during any high rate of rise of voltage resulting from noise pulses.

The disabling network of the circuitry described thus far prevents the oscillator circuit from being actuated during voltage pulses resulting from noises. This will take care of noise pulses up to 2 mj of energy. The remainder or enabling network of the circuitry to be described permits it to actuate the oscillator circuit in the following manner:

The diode D1, which may be a 400 volt PIV rectifier, rectifies the A.C. signal and supplies D.C. to the enabling circuit during each positive pulse or half cycle. When ringing voltage is applied, the capacitor C4, which may be a 2.2 microfarad capacitor, charges through the resistor R9, which may be a 470K resistor, in the positive half cycle, and discharges through the second identical resistor R10 in the negative half cycle. However, since the charging current, provided by the 90 volt signalling circuit supplied to the telephone, is much larger than discharge circuit to ground, the capacitor C4 builds up a net charge which increases with each cycle of signalling voltage supplied to the telephone. The charge on the capacitor C4 is limited by a voltage-clamping element in the form of the 15 volt zener diode Z4 which is like Z3. After a few cycles the voltage is sufficiently high to break down the reversed biased emitter base junction of the signal NPN transistor Q2, which functions as a 7 volt zener. A junction of this type was chosen in this case due to the fact that it exhibits less leakage current than a conventional zener. At this time, current is supplied to the base of the transistor Q1, through the 1M limiting resistor R11, and it then conducts, completing the circuit to the oscillator portion of the circuitry, allowing it to actuate the crystal P1. However, the enabling circuitry will not function during the generation of voltage pulses as a result of noise.

A typical single noise pulse on the telephone line is approximately 5 to 10 milli-seconds in duration. This amount of time is not sufficient to charge the enabling network to the point of turning on the transistor Q1, due to the comparatively long required charging time of the network. During the dialing, which is the worst noise condition, the pulses occur about 10 times per second. This yields one pulse every 100 milliseconds, but since the discharge rate of the capacitor C4 is approximately 1/5 the charging rate and it needs only 50 milliseconds to discharge any charge accumulated during a 10 millisecond pulse, the capacitor will not accumulate any net charge from pulse-to-pulse and, therefore, the transistor Q1 will never conduct during noise pulse situations, and there will be no sound developed by the oscillator circuit. Oscillator frequency can be controlled by R2 independently of the disabling circuit including the components D1, R9, C4, Z4, Q2, R11, C3, R8, Q1, R7, C2 and Z3.

Voltages through the leads are received and parallel rectification thereof is effected and only voltages in the selected range of proper signalling voltages are applied to the oscillator circuit by the disabling circuit. The oscillator frequency can be controlled independently of the disabling circuit so that changing one parameter will not affect the other. The square waves produced by the oscillator circuit have a higher harmonic content with a louder sound output. Each of the circuits disclosed includes a separate square wave oscillator driving state connected to a downstream buffering and driving stage and only the buffering stage applies power to the piezoelectric crystal.

Signalling voltage pulses from the telephone line usually range from 80 to 110 volts. The noise voltage pulses resulting from normal use of the telephone instrument usually run from 45 to 250 volts. With the simple and low cost circuit of FIG. 5, noise pulses of 60 volts amplitude or less, which are the majority, will be suppressed. With the circuit of FIG. 6, practically all noise pulses will be suppressed. Therefore, these noise pulses will be prevented from operating the oscillator circuit to develop spurious sound by the disabling means for the oscillator circuit included in both forms of each circuit of this invention.

Figure 7:
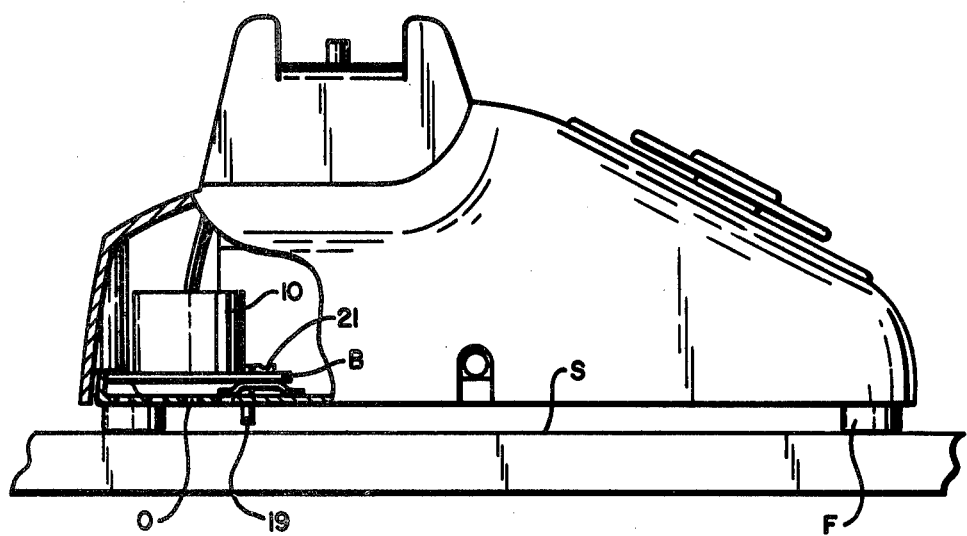
FIG. 7 is a schematic side elevational view of the base of a common type of desk telephone, the case being cut away to show the signalling device of this invention positioned therein.
Figure 8:
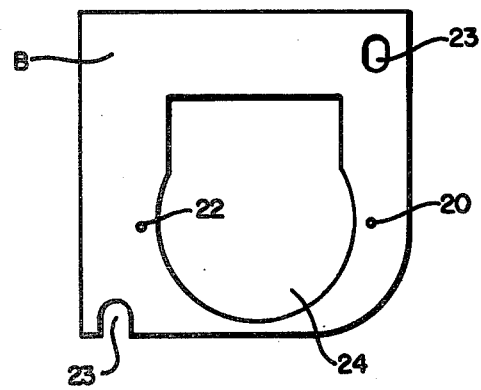
FIG. 8 is a plan view of an adapter bracket used in mounting the device on the telephone.

In replacing the usual bell-type telephone ringer with this device, an adapter bracket will be supplied. For example, as indicated in FIG. 7, the device of this invention is substituted in the telephone base for the usual bell by means of a substantially frame-like bracket B on which housing lugs 11 rest and are fastened by suitable screws passing into openings 20. The bracket is so shaped that it can be fastened in the instrument by the two screw-receiving sockets provided for mounting the usual bell ringer, by means of screws 21 cooperating with the screw-opening 23 and notch 24 at diagonally opposite positions in the bracket. The lug portion 19 will depend through the usual slot provided for the bell-adjusting means. This bracket is provided with the large central opening 24 to expose the lower end of the housing which will be above a series of openings O in the bottom of the phone case. Since the case is usually supported on feet F, the spaced surface S of the desk or table will serve as an additional sounding board for the sound waves emitted by the device. In most cases there will be a sound-reflecting surface below the disc 13 of the device.

The telephone signalling device of this invention, with the mechanical elements and circuit elements described in the assembly shown and described, is much smaller, lighter, simpler and more efficient than the electromechanical bell which it is designed to replace. The small size and low weight not only facilitate replacement of present telephone bells but will enable the design of new styles of telephone instruments which are of smaller compact form and more streamlined. For example, the size of the device described and with the stated elements assembled as indicated, occupied a mere 1.39 cubic inches of volume. This is versus the approximately 15.5 cubic inches of volume occupied by the conventional bell ringer incorporated in the common type of desk phone.

It has been found, in actual use, that the device of this invention has a penetrating, instant, pleasant tonal quality. It can be adjusted by the mechanical volume control or dampener through a continuously-variable range to very low sound levels which permits a much quieter signal for office use or other similar desirably unobtrusive applications.

The standard electromechanical ringer is mechanically resonant (selective) to certain frequencies of ringer signals. These frequencies are several and lie in a band of 16 Hz. to 66 Hz. Originally this provision was to allow selective ringing on party lines. As party lines are now on the wane, this consideration is diminishing in importance. Most areas have available private line service, but many of the old, odd frequency ringers are still in use because it is economical to retain the equipment and because hundreds of thousands of telephones with odd frequency ringers were installed in the field. To avoid changing the ringer supplies and connections, when individual telephones are repaired or installed on an odd frequency line, an appropriately resonant ringer must be used. This tends to make the inventory and replacement of ringers complex in some areas of the country. The device of this invention, on the other hand, is non-frequency selective and responds only to the presence of proper signalling voltage on the line. This means that it will operate with any private line connection, regardless of ringer frequency. This is sure to be desirable in the context of the preceding situation.

As indicated previously, others have developed or attempted to develop electronic ringer substitutes. The resulting hardware has had limited application on office phones and PBX systems. Low volume outputs, lack of volume control, size, reliability and noise pulse suppression were all limiting factors. The very simple but effective noise pulse suppression incorporated in this device is very desirable. Others have gone to considerable lengths to effect this capability and the design has suffered economically and technically as compared to the system disclosed herein.

Some of the other ringers in use appear to be well designed electroncially but feature loud speakers or standard telephone (audio) receivers as the sound transducer. The piezoelectric unit provided by this invention offers advantages in sound output and efficiency over both, and a reliability advantage over the loud speaker in addition. The sealed water-proofed circuit is also an important advantage over other ringers. Also, the transient (lightning) protection capability is an integral feature of the device of this invention.

Thus, it will be apparent that the electronic audio device or unit of this invention has many advantages characteristics which make it very desirable to substitute it for the usual electromechanical ringer of a telephone, either as a replacement for that ringer in existing telephone instruments or as a part of the original manufactured instrument.

Having thus described the invention what is claimed is:

1. A signalling device for telephones or the like comprising a housing, a printed circuit board mounted within the housing and carrying solid state circuit components in a circuit, a piezoelectric-actuated flexible diaphragm also mounted within the housing in spaced relationship to said circuit board, said flexible diaphragm carrying a piezoelectric element connected in the circuit, said circuit including:
    a set of leads adapted to be connected to the telephone voltage supply line for receiving signalling voltage therefrom;
    a square wave oscillator audio-signalling circuit connected to said leads and including a square wave driving network with oscillator frequency controlling components connected to a buffer driving network including said piezoelectric element;
    a shunt-type rectifying and voltage-limiting network connected between the leads and the oscillator circuit for receiving, shunt-rectifying, and limiting the voltage supplied by the telephone voltage supply line to a selected range and applying the resulting output voltage to the oscillator circuit, said rectifying and voltage-limiting network including a voltage-dropping resistance, and a voltage-clamping element for suppressing the application of voltages other than proper signalling voltages to the oscillator circuit; and
    a disabling network connected between the leads and the oscillator circuit for disabling the oscillator circuit except when proper signalling voltage is supplied through said leads so as to prevent undesired audio outputs in the telephone to which it is applied when voltages other than proper signalling voltages are present on the telephone voltage supply line, said disabling network, including signal-attenuating components for preventing application of voltages to the oscillator circuit unless they are in the selected range of proper signalling voltages.

2. A signalling device according to claim 1 in which:
said disabling network components include a zener diode to prevent the application to the oscillator circuit of voltages below the selected range.

3. A signalling device according to claim 1 in which:
said disabling network components include:
    a normally non-conducting transistor connected between the voltage supply leads and the oscillator circuit and to ground;
    a series voltage-dropping resistor and zener diode voltage limiter connected in parallel to the oscillator circuit to supply pre-determined voltage thereto from the leads;
    a resistor and capacitor connected in parallel to said voltage supply leads to suppress additional voltage pulses to the oscillator circuit if the transistor allows some leakage from the leads, during high voltage impulses, other than the selected signalling voltages, which arise on the telephone voltage supply line as a result of direct or induced lightning transients or use of the telephone; and an additional resistor and capacitor connected in parallel to the oscillator circuit through the transistor for preventing turning on thereof by collector base leakage or high rate of voltage increases in voltage through the leads; said voltage-limiting network being incorporated in an enabling circuit in which:

the voltage-clamping element is a zener diode connected in parallel with the said voltage-dropping resistance and a capacitor and in series to a second transistor which is connected in series with said normally non-conducting transistor.

4. A signalling device according to claim 1 in which: said oscillator circuit is a complementary metal oxide semi-conductor hex inverter integrated circuit which has:

the said square wave driving network with two inverters, a resistance and a condenser connected in series and with the oscillator frequency control in the form of a potentimeter connected in parallel; and the said buffer driving network is connected to the output of said square wave driving network and includes four additional inverters arranged as a bridge amplifier connected to the said piezoelectric element.

5. A signalling device according to claim 1 in which the housing is tubular and has one end as an open outlet end;

said printed circuit board being on a first disc spaced axially within the open end;

said flexible diaphragm being a second disc mounted within the housing axially outwardly of the first disc to provide a space therebetween and carrying the piezoelectric element in the form of a disc-like amorphous piezoelectric ceramic element bonded to the diaphragm, the diaphragm being supported by the housing at its edge, said element being connected in circuit with the components on said board; and a rigid baffle disc supported within the housing axially outwardly of the second disc and arranged to permit said waves hitting the baffle disc to be deflected around its edge toward the outlet end of the housing thereby producing a folded horn acoustical loading characteristic.

6. A signalling device according to claim 5 including:

an adjustable mechanical volume control carried by the tubular housing adjacent its outlet end and spaced outwardly of said rigid baffle disc and consisting of:

relatively rotatable discs in superimposed relationship which have cooperating openings adapted to provide sound wave passages when in communication and movable into and out of concidence to varying degrees to vary the size or to close said passages.

7. A signalling device according to claim 6 in combination with a telephone having said leads connected to the device and means for mounting the said tubular housing on the telephone, said means comprising:

an adapter bracket having a central opening to expose the openings of the relatively rotatable discs; said bracket being provided with means for attaching it to the telephone; and said housing having lugs for attaching it to the bracket in cooperation with the central opening thereof.

* * * * *